H. L. GALBRAITH.
DIRIGIBLE HEADLIGHT.
APPLICATION FILED JULY 17, 1913.

1,093,178.

Patented Apr. 14, 1914.

Witnesses
Einar Larson
E. F. Camp

Inventor
Henry L. Galbraith.
By Eugene V. Kevern
Attorney

UNITED STATES PATENT OFFICE.

HENRY L. GALBRAITH, OF BOZEMAN, MONTANA.

DIRIGIBLE HEADLIGHT.

1,093,178.  Specification of Letters Patent.  Patented Apr. 14, 1914.

Application filed July 17, 1913. Serial No. 779,525.

*To all whom it may concern:*

Be it known that I, HENRY L. GALBRAITH, a citizen of the United States, residing at Bozeman, in the county of Gallatin and State of Montana, have invented certain new and useful Improvements in Dirigible Headlights, of which the following is a specification.

This invention relates to that class of headlights for automobiles and other vehicles, which are connected to the steering mechanism of the vehicle in such a manner that they are automatically shifted when the vehicle is making a turn or traveling on a curve, whereby the beam of light is made to follow the curve of the road instead of being thrown to one side thereof to follow the course of the vehicle body.

It is the object of the present invention to provide an operating connection for the lamp which is efficient and reliable in operation, and which is not affected by the rocking movement of the vehicle body, and which is also simple in construction and readily applied without altering the structure of the vehicle or that of the steering gear.

With these objects in view, the invention consists in a novel combination and arrangement of parts to be hereinafter described and claimed, reference being had to the accompanying drawing, in which—

Figure 1:
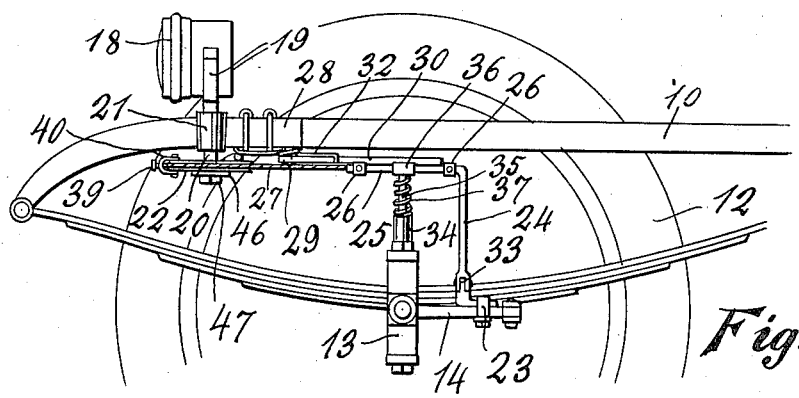
Figures 2, 3:
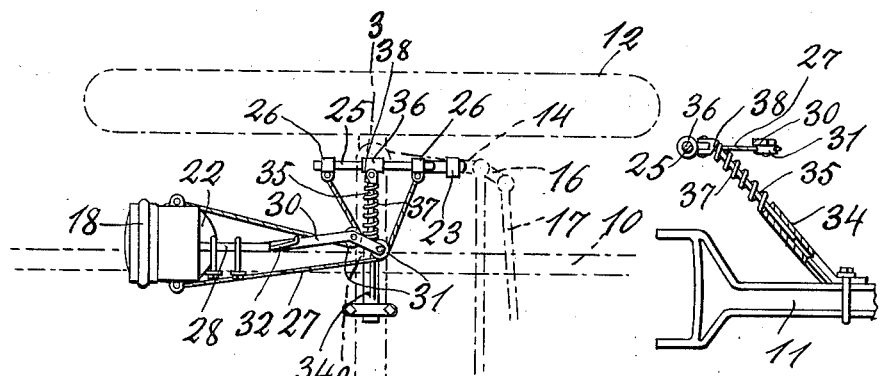
Figure 4:
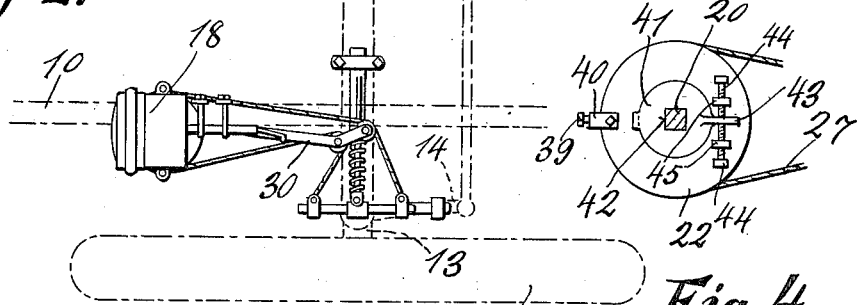
Figure 5:
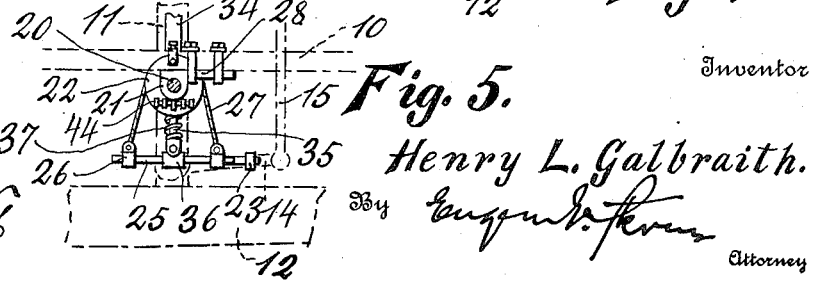

Figure 1 is a side elevation of the front portion of an automobile, showing the application of the invention. Fig. 2 is a plan view. Fig. 3 is a cross section on the line 3—3 of Fig. 2. Fig. 4 is a plan view showing the connection between the lamp bracket stem and the lamp shifting device. Fig. 5 is a plan view showing a slight modification.

In the drawing 10 denotes the side-bars of the chassis of an automobile and 11 is the front axle to which the steering wheels 12 are connected by a knuckle joint 13, as usual, said joint having the customary steering arms 14 which are connected by a reach rod 15. One of the knuckles has an arm 16 to which the steering rod 17 is connected. These parts are all constructed and arranged in the ordinary manner, and as nothing is claimed with respect thereto, a further description thereof is deemed unnecessary. Each lamp 18 is carried by a bracket 19 having a vertical stem 20 which is mounted for rotation in a bearing 21 carried by the side-bar 10. The lower end of the stem depends from the bearing, and to said end is made fast a grooved pulley 22. To the steering arm is made fast, by a clip or other suitable means 23, an upstanding bracket arm 24 terminating at its upper extremity in a horizontal portion 25, which is located above the knuckle-joint 13 and crosses a point which is in line with the axis of said joint. To the part 25 are fastened, by means of suitable clips 26, the two ends of a cable or other flexible connection 27, the connections being made on opposite sides of and equidistant from the axis of the knuckle-joint 13. The bearing 21 has a lateral branch 28 carrying at the bottom a stud 29 on which is pivoted, to swing in a horizontal plane, a support 30 for two guide pulleys 31, said support being an arm carrying at its extremity the journals of the pulleys. The cable 27 passes around the pulley 22 and one end, after passing around one of the guide-pulleys 31, extends to the part 25 and is connected thereto. The other end of the cable passes around the other guide pulley 31 and extends to the part 25 and is connected thereto. The two ends of the cable are connected to the part 25 on opposite sides of the axis of the knuckle joint 13. To the part 28 is anchored a spring 32 having its free end bearing against the arm 30. This spring tends to swing the arm in a direction to hold the cable 27 taut, and also allow the free and accurate working of the lamp as the body of the car adjusts itself to the axle on rough roads. Both lamps 18 are provided with the herein described operating means.

In operation, the movement of the steering arms 14 swings the parts 25 in a horizontal plane, which motion is transmitted to the lamps, by the cables 27, and the latter are thus swung around with the wheels 12, so that the beams of light are made to follow the direction of the wheels.

The arms 24 are in two sections connected by a hinge joint 33 to permit lateral motion, and the arms are kept firmly in position by braces. Each of these braces comprises an arm 34 which is made fast to the axle 11 and carries a telescoping rod 35 having its outer end connected by a clip 36 to the part 25. A spring 37 is coiled around the rod 35 between an abutment 38 thereon, and the outer end of the arm 34. The telescoping part 35 is for the purpose of allowing the swing of the part 25 relative to the axle 11. The pulley 22 has a grooved periphery in which the cable 27 seats. The cable is made fast to the pulley by a clamping screw 39 threaded through a yoke 40 carried by the pulley.

In order to accurately adjust the parts, the pulley 22 has an inner section 41 provided with a central square aperture 42 through which the stem 20 passes. The inner section has a radially extending finger 43 which is located between two axially alined adjusting screws 44 threaded in opposite directions through lugs 45 on the outer portion of the pulley. By operating the screw the inner section of the pulley can be rotated relative to the outer section to properly adjust the lamp to the operating devices. The pulley 22 is held in place on the stem 20 by a washer 46 and nut 47.

Fig. 5 shows a slight modification in which the cable 27 passes directly to the pulley 22, the guide-pulleys 31 being dispensed with.

I claim:

1. The combination with a vehicle and its steering arm; of a bracket carried by the steering arm, a lamp having a rotatable supporting-stem, a pulley fixed to said stem, said pulley comprising inner and outer sections which are adjustable angularly relative to each other, and a flexible connection passing around the pulley and having its ends connected to the bracket.

2. The combination with a vehicle and its steering arm; of a bracket carried by the steering arm, a lamp having a rotatable supporting-stem, a pulley fixed to said stem, said pulley comprising inner and outer sections which are adjustable angularly relative to each other, a finger extending radially from one of the sections, and opposite axially alined screws carried by the other section, between which screws the finger extends, and a flexible connection passing around the pulley and having its ends connected to the bracket.

3. The combination with a vehicle, an axle, a steering wheel, a knuckle-joint connection between the axle and the steering wheel, and a steering arm extending from the knuckle-joint; of a bracket carried by said steering arm and having a horizontal arm located above the knuckle-joint and crossing a point which is in alinement with the axis of said joint, said bracket being in hinged sections, a brace between the axle and the horizontal arm, said brace comprising telescopically connected sections, a lamp having a rotatable supporting-stem, a pulley fixed to said stem, and a flexible connection passing around the pulley and having its ends connected to the horizontal arm on opposite sides of the knuckle-joint axis.

In testimony whereof I affix my signature in presence of two witnesses.

HENRY L. GALBRAITH.

Witnesses:
L. A. BRITTAN,
ALFORD YERGEY.

---

Copies of this patent may be obtained for five cents each, by addressing the "Commissioner of Patents, Washington, D. C."